Figure 6:
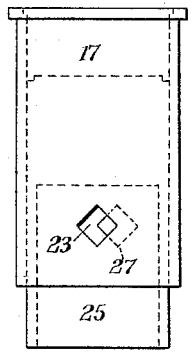

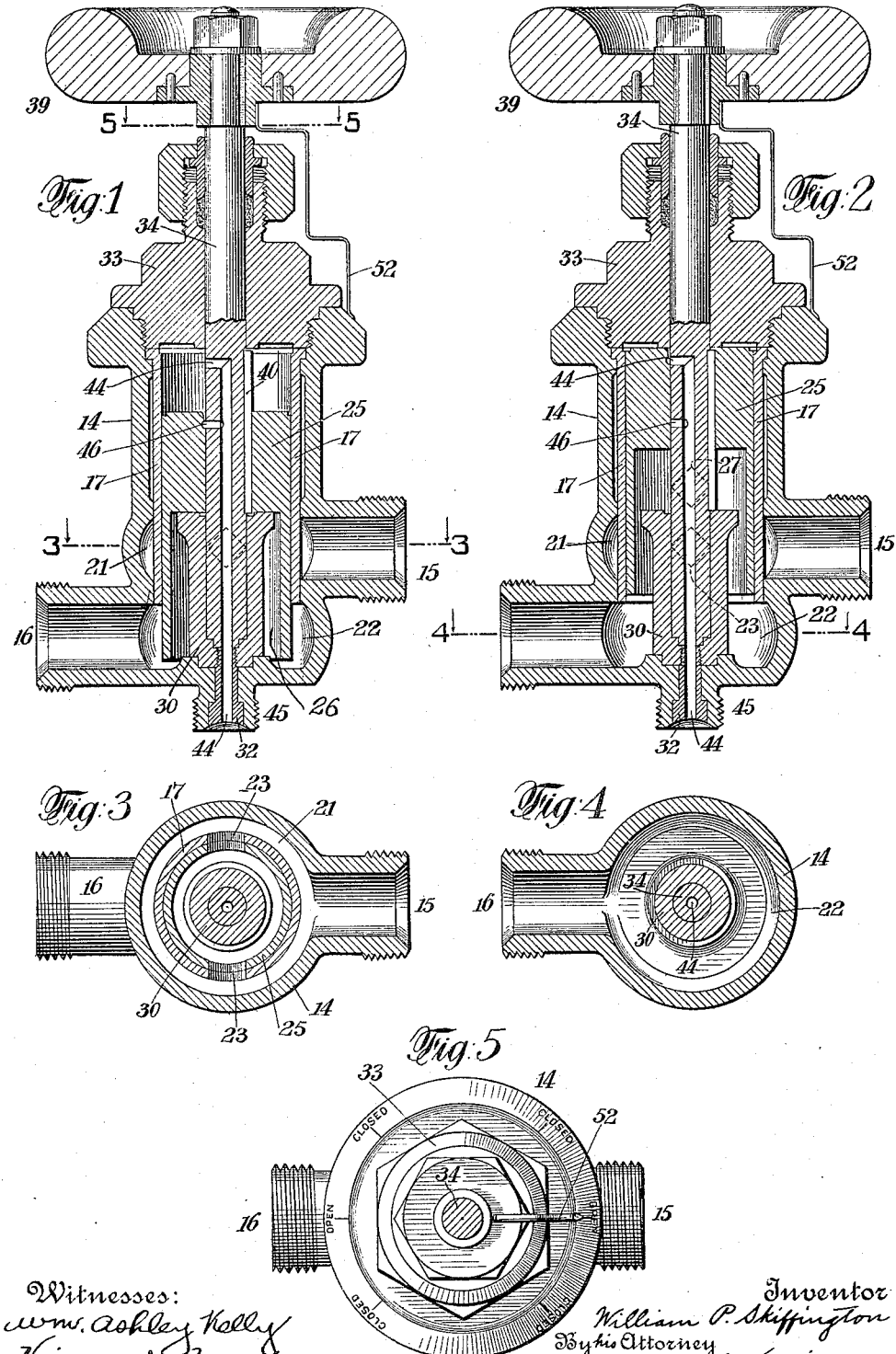

W. P. SKIFFINGTON.
AUTOMATIC VALVE.
APPLICATION FILED AUG. 22, 1911.

1,148,805.

Patented Aug. 3, 1915.
2 SHEETS—SHEET 2.

Witnesses:
Wm. Ashley Kelly
Victor D. Borst

Inventor
William P. Skiffington
By his Attorney
Henry D. Williams

UNITED STATES PATENT OFFICE.

WILLIAM P. SKIFFINGTON, OF NEW YORK, N. Y.

AUTOMATIC VALVE.

1,148,805. Specification of Letters Patent. Patented Aug. 3, 1915.

Application filed August 22, 1911. Serial No. 645,371.

*To all whom it may concern:*

Be it known that I, WILLIAM P. SKIFFINGTON, a citizen of the United States, residing at the borough of Manhattan, city of New York, in the county of New York and State of New York, have invented certain new and useful Improvements in Automatic Valves, of which the following is a specification, reference being had therein to the accompanying drawings, forming part thereof.

My invention relates to automatic valves, that is to say, to that class of valves which are adapted to effect automatically a regulation of the fluids flowing through them. One of the uses to which valves of this general type are adapted is to automatically regulate the amount of steam supplied to a radiator in a steam heating system, and that is the use to which I have shown my invention as applied, though it is to be understood that there are other uses to which my invention is applicable.

My present invention belongs more particularly to that type of automatic valves in which action is intermittent.

One of the objects of my invention is to effect the automatic actuation of a valve by means of differences of pressure between the low pressure side of the valve and any desired source of pressure; for example, between the pressure in a steam heated radiator and that in the discharge pipe or exhaust pipe leading therefrom.

Another object of my invention is to provide for regulation by the operator of the valve orifices so as to regulate the automatic action of the valves as well as to close the valves independently of their automatic action.

Other objects of my invention are simplicity, compactness and inexpensiveness of construction.

Other more particular objects and advantages will hereinafter appear.

My invention includes a valve the movements of which are automatically actuated by opposing fluid pressures independent of the inlet pressure.

My invention also includes adjusting means acting independently of the automatic means to modulate or regulate the quantity of fluid passing the valve in a given interval of time.

My invention also includes a movable fluid-controlling part having two independent movements for controlling the flow of fluid, whereby one of the movements may be automatically controlled and the other movement may be effected by the operator to regulate and control the automatic action of the valve.

My invention more particularly includes a valve piston having a longitudinal fluid-controlling movement and also having a rotative fluid-controlling movement, the two movements being independent one of the other.

My invention also includes improved means for effecting fractional control, affording a large range of adjustment of the valve as to the quantity of fluid permitted to pass through the valve in a given time.

My invention also includes various details of construction and combinations of parts, as will appear from the following description of an embodiment thereof illustrated in the accompanying drawings.

I shall now describe my invention with reference to these drawings and shall thereafter point out my invention in claims.

Figure 7:
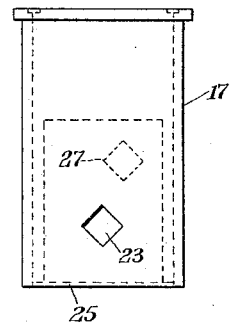
Figure 8:
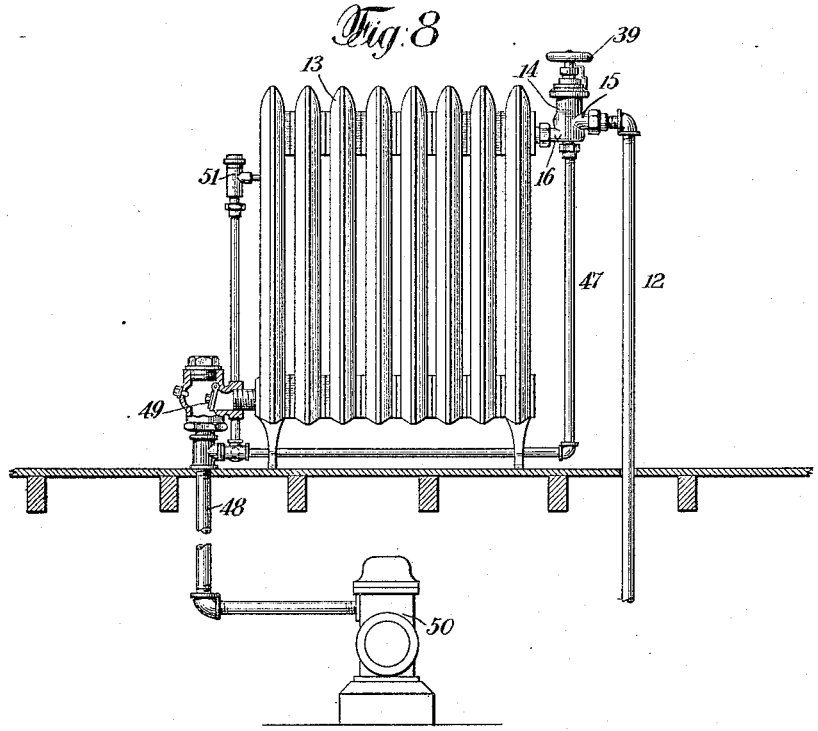

Figure 1 is a central vertical section of the valve in its most widely open position. Fig. 2 is a similar view with the valve in automatically closed position, the valve piston being at the top of the valve cylinder. Figs. 3 and 4 are transverse horizontal sections on planes indicated by the lines 3—3 and 4—4 of Figs. 1 and 2, respectively, as viewed from above. Fig. 5 is a horizontal section on a plane indicated by the line 5—5 of Fig. 1 as viewed from above. Figs. 6 and 7 are elevations of the valve cylinder and piston with the valve piston in the lower and in the upper position, respectively, the valve piston being shown as rotatively adjusted in the valve cylinder for a reduced opening thereof when the valve piston is in lower or open position. Fig. 8 shows my improved valve in elevation, on a much reduced scale, as employed in a steam heating system.

In the accompanying drawings, my invention is shown in Fig. 8 as connected between a steam supply pipe 12 and a radiator 13 in a steam heating system, for regulating the supply of steam to the radiator. The valve in the illustrated embodiment of my invention, has a casing or outer wall 14 provided with an inlet 15, to which the steam supply pipe 12 is shown as connected, and an outlet 16 shown as connected to the radiator 13. The body of the casing 14 is in its general shape cylindrical with the inlet 15 at a higher level than the outlet 16, as shown, the bottom closure or lower wall being formed integral with the side walls of the casing and substantially at a level with the lower side of the outlet 16. Within the casing 14 is fitted a cylindrical liner or inner wall 17, which extends from a point near the top of the body of the casing 14 to a point, flush with the upper side of the outlet 16. At its upper end, the inner wall 17 is provided with a slight flange which stationarily supports the inner wall 17 within the casing. It is to be noted that this manner of supporting the liner 17 permits free longitudinal expansion and contraction thereof relatively to the outer casing 14.

The casing 14 has a circular inlet passage or inlet throat 21 surrounding the inner wall 17, and communicating at one side with the inlet 15, as clearly shown in Figs. 1, 2 and 3. Below the inlet throat 21 and separated therefrom and below the lower end of the inner wall 17, is an oppositely arranged circular outlet passage or outlet throat 22 opening into the outlet 16, as clearly shown in Figs. 1, 2 and 4. For convenience, the construction is such that the inlet 15 enters the casing at one side and the outlet 16 leaves the casing at the opposite side. The inner wall 17 at diametrically opposite points thereof shown as equally spaced from the inlet 15 has two ports 23 shown as of rectangular diamond shape with opposite angles disposed in vertical and horizontal planes, respectively. The ports 23, the inlet throat 21 and the inlet 15 have a common central horizontal plane.

A valve piston 25 controls the ports 23 and thereby controls communication between the inlet and the outlet. This valve piston 25 constitutes a movable fluid-controlling part capable of two independent movements for controlling the flow of fluid through the valve device, such valve piston having a longitudinal fluid-controlling movement and also having a rotative fluid controlling movement, these two movements being independent one of the other.

The valve piston 25 is cylindrical and fits closely in the cylindrical inner wall 17, forming a closure for the cylinder and is provided with a long skirt forming a deep inverted cup at the lower part thereof. Ports 27, corresponding in number and shape to the ports in the inner wall 17, are formed in the skirt of the valve piston 25. The valve piston 25 fits closely within the inner wall 17 and is free to move longitudinally therein. The downward movement of the valve piston 25 is limited by a post 30 rising from an annular boss formed on the inner side of the closed bottom of the casing 14, upon which the post 30 is rigidly held in place by a screw plug 32. The valve piston 25 normally rests on the post 30 by reason of gravity and is thereby supported at such a height that its lower edge is a substantial distance above the bottom of the casing so that pressure fluid may freely pass beneath it.

The upward longitudinal movement of the valve piston 25 is limited by a bonnet 33 of the casing, which is screwed into the top of the body, closing the casing at the top and holding in place the inner wall 17. The bonnet 33, the inner wall 17 and the bottom part of the casing form a cylinder within which the valve piston is reciprocated in the automatic operation of the valve.

To enable the valve piston 25 to be rotated when desired and also to guard it against undesired rotation, a valve stem or valve spindle 34 passes concentrically through the bonnet 33, a packed joint of usual construction being provided in the bonnet. The spindle or stem 34 is provided at its outer and upper end with an actuating hand wheel 39 for effecting rotation of the valve stem 34 and valve piston 25. At its inner and lower end the valve stem 34 is journaled in a step bearing in the post 30. Intermediate of its ends within the inner wall 17, the stem 34 is provided with a feather 40, the upper end of which abuts the bonnet 33 and thereby holds the valve stem 34 in place.

The valve stem 34 extends concentrically with the inner wall 17, and the valve piston 25 is mounted concentrically on the valve stem and is prevented from rotating relatively to such stem by the feather 40, which enters a corresponding groove in the piston 25, and the valve piston 25 is free to slide longitudinally on the stem 34.

Below the valve piston 25, and within the inverted cup formed by the skirt thereof, a combined cushion and pressure chamber is formed communicating with the outlet 16. At the top of the valve piston 25, an upper cushion and pressure chamber is formed between the top of the piston and the bonnet 33. A fluid-conveying duct 44 communicates with this upper chamber and leads from any desired location or source of pressure. This fluid-conveying duct 44 is shown as formed through the valve stem 34 and the screw-plug 32 at the bottom of the casing and at its lower end is surrounded by a nipple 45, which may be connected to any desired means for controlling the fluid pressure in the upper chamber. For drainage, when the valve piston is in lower position, a lateral duct 46 enters the duct 44 from the chamber above the valve piston. Near its upper end the piston 25 has an annular groove surrounding the valve stem and communicating with the ducts 44 or 46 according as the piston is at its upper or lower position, the piston fitting loosely on the valve stem above this groove, to permit the passage of fluid, but fitting closely, though movably, thereon below such groove. In Fig. 8 of the drawings the nipple 45 of the fluid-conveying duct is shown as connected, through a pipe 47, with an exhaust pipe or discharge pipe 48 leading from the radiator 13.

When the valve piston 25 is in lower position and also when it is in the position of rotative adjustment shown in Figs. 1 and 3, with the ports 27 of the valve piston in full communication with the ports 23 of the inner wall 17, the valve is most widely open and the greatest quantity of fluid can pass through the valve in a given time. The valve piston 25 is adapted to be automatically moved longitudinally to shift the ports of the piston 25 out of communication with the ports of the inner wall 17, and thus to entirely shut off communication between the inlet and outlet of the valve, and is also adapted to be automatically moved longitudinally in the opposite direction to restore the valve piston 25 to a position again permitting such communication. Also the valve piston 25 is adapted to be manually rotatively adjusted to vary the extent of the communication permitted, and, if desired, to entirely prevent such communication or close the valve. The valve piston 25 is subjected at its lower end to the pressure of the valve outlet 16 and at its upper end to the pressure admitted at the lower end of the valve casing through the duct 44. The pressure at the valve outlet 16 tends to force the valve piston upward to close off communication between the inlet and the outlet. This movement of the valve piston 25 occurs automatically when the fluid pressure below the valve piston rises sufficiently to overcome the weight of the valve piston, which has a gravity bias to the open position, and sufficiently also to overcome opposing pressure above the valve piston. Because of the fact that in the lowermost position of the valve piston 25, the annular upper end of the tubular post 30 is in contact with a portion of the lower surface of such valve piston and to that extent shields it from initial upward pressure, the upward pressure on the piston 25 will be suddenly increased as soon as it has begun its upward movement so that it will quickly complete such movement to its uppermost position shown in Fig. 2. In its return or downward movement the valve piston 25 will be cushioned by the fluid in the lower chamber, such fluid being at the pressure obtaining at the valve outlet.

In the practical application of the invention illustrated in the drawings, when the pressure of steam in the radiator 13 rises sufficiently above the pressure in the discharge pipe 48 this pressure in the radiator is exerted beneath the piston valve 25 and moves the valve piston 25 upward to the uppermost position thereof shown in Fig. 2. On the other hand, when the fluid pressure in the radiator 13 falls sufficiently, due to the condensation of the steam therein, then by reason of the weight of the valve piston 25 and also by reason of whatever downward pressure may be communicated to it from the discharge pipe 48, through the pipe 47 and duct 44, the valve piston 25 will descend to the communication-opening position as shown in Fig. 1. Thus the valve piston 25 is automatically intermittently actuated by the difference between the pressure within the radiator 13 and the pressure in the discharge pipe 48.

The discharge pipe 48 is provided, close to the radiator 13, with an outwardly-opening check-valve 49 which prevents a return flow of steam from the discharge pipe 48 to the radiator 13 and permits condensation of steam in the radiator 13 to be carried to a point where there may be a lower pressure in the radiator 13 than there is in the discharge pipe 48, the valve of my present invention then automatically acting at the proper time to reopen communication between the radiator 13 and the steam supply pipe 12, which in turn is again automatically shut off when the pressure in the radiator rises sufficiently above the pressure in the discharge pipe 48, and so on.

Steam may be supplied through the supply pipe 12 from any desired source, for example, from a boiler, and a suitable degree of exhaustion in the discharge pipe 48 may be produced in any desired manner, such as by a wet vacuum pump 50 of usual or suitable construction. A usual thermostatic valve 51 is shown as connected to the radiator 13 and to the discharge pipe 48 for initially removing the air from the radiator 13. As the valve 51 will be thermally closed when steam is flowing, it may be connected to the discharge pipe 48 below or beyond the check-valve 49 from the radiator 13, as shown in Fig. 8.

In the position of rotative adjustment of the valve piston 25 illustrated in Figs. 1, 2 and 3, the valve piston will be alternately automatically actuated from the most widely open position shown in Figs. 1 and 3, to the completely closed position shown in Fig. 2, and vice versa. Rotative adjustment of the valve piston 25 will lessen the extent of communication to anything desired or will entirely prevent communication, this adjustment being effected by rotating the hand wheel 39 to thereby rotate the valve piston 25 through the spindle 34, the rotative adjustment being maintained by the friction of the stem 34 in its packed joint. As the ports 27 in the piston 25 and the corresponding ports 23 in the inner wall 17 are equally angularly spaced, being shown as spaced 180°, a rotation of the valve piston 25 from the wide open position, through an angular distance equal to the common angular dimension of each of the ports, will close the ports, regardless of the direction of rotation of the valve piston 25. Intermediate degrees of piston rotation will provide intermediate adjustment of the valve ports, the diamond shape of the ports rendering the adjustment gradual from the most widely open to the completely closed position. A position of greatly reduced communication is shown in Figs. 6 and 7, Fig. 6 showing the automatically opened and Fig. 7 the automatically closed position of the valve ports. This adjustment shown has been produced by the rotation of the piston 25 in a counter clockwise direction looking from the top from the most widely open position. Had the piston 25 been rotatively adjusted in the opposite direction, then the practical results would have been the same, because of the fact that the extent of the communication through the ports would have been similarly gradually reduced. In either case, the regulation will be gradual.

In any of the positions of adjustment, excepting of course the completely rotatively closed, the valve piston 25 will continue to be intermittently automatically actuated by the differences of fluid pressure as hereinbefore described, but as the total area of the port communication between the inlet 15 and the outlet 16 is reduced by the adjustment just described, the rate of flow of steam into the radiator will be reduced after each communication opening pulsation of the valve piston 25, with the direct result of a corresponding reduction of the quantity of steam consumed and the amount of heat radiated by the radiator. Any reasonable degree of heating regulation desired may thus be effected.

If the valve piston 25 be turned farther than required for the purpose of regulation, the steam will be shut off entirely by the complete closing of the ports. In the valve illustrated in the drawings, this entire closing of communication between the inlet 15 and the outlet 16 will take place if the valve piston 25 be rotated a little more than a quarter turn from its most widely open position, this result being dependent upon the angular dimensions of the valve ports. Therefore, it is to be noted that the same movement by which the extent of communication permitted may be adjusted may also serve to close off communication entirely.

Means are provided for indicating the position of rotative adjustment of the valve piston 25. Such means comprise a pointer 52 carried by the hand wheel 39 and coöperative with a scale formed on the top of a flange at the upper end of the body of the casing. As illustrated in Figs. 1, 2, 5 and 8, the position of the pointer 52 indicates that the valve is so rotatively adjusted as to permit the passage of pressure fluid to a maximum extent when the valve piston 25 is in lower or communication-opening position. This position of adjustment is marked on the scale (Fig. 5) by the word "Open." The opposite position of the pointer 52 corresponds also to a complete opening of the valve, because of the diametral arrangement of the valve ports, as hereinbefore explained, and is also marked on the scale by the word "Open." Four intermediate points are indicated by the words "Closed," each indicating the initiating of the completely closed position as the pointer is moved in either direction away from either of the completely open positions. Any degree of intermediate adjustment may be had between the completely closed and the fully open positions of rotative adjustment. The duplication of the indications in diametrically opposite positions permits either set of indications to be used as may be most convenient.

In operation, when it is desired that no fluid shall pass through the valve, the pointer 52 is set at "Closed" or anywhere beyond. When it is desired that fluid shall pass, the pointer 52 is set at "Open," or at either side thereof, according to the rapidity with which it is desired fluid shall be supplied through the valve, and when thus set or adjusted, fluid will pass through and the valve will be actuated automatically in the intermittent manner already explained. Because of the gravity bias of the valve piston 25, such piston will be initially in the lower or communication opening position, as shown in Fig. 1. Fluid in passing through the valve passes from the inlet 15 through the inlet throat 21, ports 23 and 27, piston cup 26, beneath the piston skirt, through outlet throat 22 and outlet 16. It will now be understood how automatic control is effected by one fluid-controlling movement of the valve piston 25 and how manual control is effected by another fluid controlling movement of such piston.

It is obvious that various modifications may be made in the construction shown in the drawings and above particularly described within the principle and scope of my invention.

I claim:

1. A valve device comprising, in combination, a casing provided with an inlet and an outlet, a valve within the casing having two independent movements for controlling fluid communication between the inlet and the outlet and responsive to pressure at the outlet to shift such valve through one of these movements to communication - closing position, means for initially shielding the valve from the valve-closing pressure at the outlet and then as soon as the valve has begun its closing movement suddenly increasing the total of such outlet pressure thereon so that the valve will be quickly shifted from the open to the closed position, means for applying pressure from any desired source in opposition to such outlet pressure to shift the valve to the open position, and independent means for controlling the other of said independent movements of the valve.

2. A valve device comprising a cylinder having a peripheral port, a valve piston forming a closure across the cylinder and reciprocative and rotative in the cylinder and having a fluid passage beginning at the periphery of the valve piston and forming through the port of the cylinder a communication independently controllable by reciprocative and by rotative movements of the valve piston, means for applying pressure at the outlet side of the device to one side of the valve piston to move the valve piston longitudinally to communication-closing position, means for applying pressure fluid from any desired source to the other side of the valve piston to longitudinally move the valve piston to open position, a stop for the valve piston at the open position having a sealing surface coöperative with the adjacent surface of the valve piston to shield the valve piston from communication-closing pressure of fluid at the outlet so that as soon as the valve piston has begun its closing movement the total outlet pressure of fluid on the valve piston will be suddenly increased to quickly shift the valve piston from the open to the closed position, and manually controlled means for independently imparting communication-controlling rotation to the valve piston.

3. A valve device comprising, in combination, a casing having an inlet and an outlet, a movable valve within the casing arranged to be shifted to open and close communication between the inlet and the outlet and responsive to pressure at the outlet to be shifted thereby to communication-closing position, means for initially shielding the valve from the valve-closing pressure at the outlet and then as soon as the valve has begun its closing movement suddenly increasing the total of such outlet pressure thereon so that the valve will be quickly shifted from the open to the closed position, means for applying pressure fluid to such valve from any desired source in opposition to such outlet pressure to shift the valve to the open position, and manually controllable means for controlling the extent of communication between the inlet and the outlet.

4. A valve device comprising a casing provided with an inlet and an outlet, a valve in the casing having movement therein for controlling fluid communication between the inlet and the outlet and responsive to pressure of fluid at the outlet to be shifted thereby to communication-closing position, means for separately and independently applying valve-opening pressure of fluid to the valve in opposition to the valve-closing pressure of fluid at the outlet to shift the valve to the open position when such independently applied pressure of fluid overcomes the pressure of fluid at the outlet, and manual means for shifting the valve so as to control the extent of communication permitted between the inlet and the outlet by reason of the fluid-controlled opening and closing movements of the valve.

5. A valve device comprising a cylinder having a peripheral port, a valve piston reciprocative and rotative in the cylinder and having a fluid passage beginning at the periphery of the valve piston and forming through the cylinder port a communication independently controllable by reciprocative and by rotative movements of the valve piston, the cylinder being provided with end closures forming within the cylinder a chamber at each end of the valve piston, a fluid passage leading from the outlet side of the valve for admitting pressure fluid to one of the end chambers to effect a communication-closing longitudinal movement of the valve piston, a fluid-conveying duct opening into the other end chamber for admitting pressure fluid from any desired source to move the valve piston longitudinally in the opposite direction, and means for manually imparting communication-controlling rotation to the valve piston.

6. A valve device comprising a cylinder having a peripheral port, a valve piston reciprocative and rotative in the cylinder and having a fluid passage beginning at the periphery of the valve piston and forming through the cylinder port a communication independently controllable by reciprocative and by rotative movements of the valve piston, the cylinder being provided with end closures forming within the cylinder a chamber at each end of the valve piston, a fluid passage leading from the outlet side of the valve for admitting pressure fluid to one of the end chambers to effect a communication-closing longitudinal movement of the valve piston, a fluid-conveying duct opening into the other end chamber for admitting pressure fluid from any desired source to move the valve piston longitudinally in the opposite direction, the valve piston also having a permanent bias tending to move it in this latter direction, and means for manually imparting communication-controlling rotation to the valve piston.

In testimony whereof I have affixed my signature in presence of two witnesses.

WILLIAM P. SKIFFINGTON.

Witnesses:
 WM. ASHLEY KELLY,
 BERNARD COWEN.

Copies of this patent may be obtained for five cents each, by addressing the "Commissioner of Patents, Washington, D. C."